United States Patent [19]

Van Mao

[11] Patent Number: 5,082,488
[45] Date of Patent: Jan. 21, 1992

[54] SOIL CONDITIONING

[76] Inventor: Raymond L. Van Mao, 1172 Alexis-Nihon, Ville St-Laurent, Quebec, Canada, H4R 1S2

[21] Appl. No.: 540,782

[22] Filed: Jun. 20, 1990

[51] Int. Cl.$^5$ .......................... C05G 3/06; C05D 5/00; C05D 9/00

[52] U.S. Cl. .......................... 71/62; 71/903; 423/324; 423/328; 423/331; 423/332

[58] Field of Search .................. 71/11, 31, 62, 903; 423/328, 329, 331, 332

[56] References Cited

U.S. PATENT DOCUMENTS

| | | | |
|---|---|---|---|
| 3,094,383 | 6/1963 | Dzierzonowski et al. | 423/328 |
| 3,623,858 | 11/1971 | Smith et al. | 71/62 |
| 4,511,667 | 4/1985 | Mao | 502/64 |
| 4,615,995 | 10/1986 | Mao | 502/64 |
| 4,810,280 | 3/1989 | Van Mao et al. | 71/62 |

*Primary Examiner*—Ferris H. Lander
*Attorney, Agent, or Firm*—Swabey Ogilvy Renault

[57] ABSTRACT

A method for enhancing the water retention capacity of soils and providing plant nutrients thereto over an extended period of time uses chryso-zeolites type A and/or X admixed with a soil at 2 to 30% by weight of the soil. The chryso-zeolites comprise a magnesium-leached asbestos matrix with a zeolite crystalline structure thereon. The composition of the chryso-zeolites includes silica—35 to 60% by weight, MgO—0.1 to 10% by weight, $Al_2O_3$—10 to 45% by weight and from 10 to 25% by weight of CaO, the CaO being optionally substituted by one or more of plant nutrient components such as potassium or ammonium. The content of sodium oxide is reduced to less that 3% by weight. The chryso-zeolites of the invention exhibit a very low phytotoxicity, good water retention and easy substitution of calcium by other nutritive components.

5 Claims, 3 Drawing Sheets

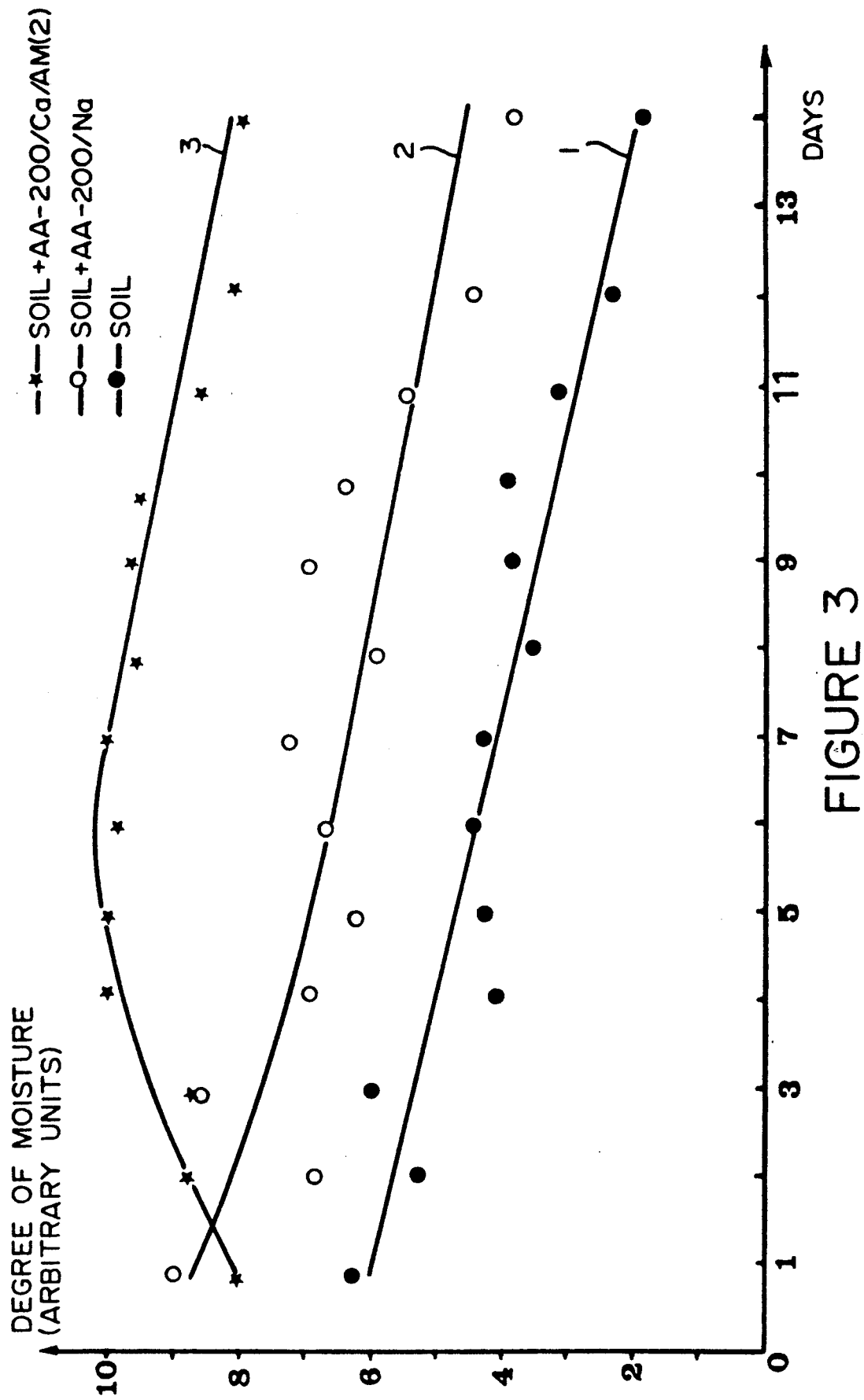

SOIL CONDITIONING

FIELD OF THE INVENTION

This invention relates to a method of enhancing water retention of soils and providing plant nutrients thereto over an extended period of time using chryso-zeolites in a mixture with the soil.

BACKGROUND OF THE INVENTION

The natural tendency of a soil to lose moisture and nutritive properties calls for preventive measures i.e. irrigation and fertilization. In this context, it is important to provide fertilizers that have little or no cytotoxicity nor phytotoxicity, and/or substances that can enhance the water retention capacity of soil for a relatively long period of time, in the order of, say, up to two weeks, between water supplies.

It would be advantageous to find substances that can be used as "total" soil conditioners i.e. would both enhance the water retention and provide important nutrients to soil without excessive plant toxicity.

The use of synthetic and natural zeolites as soil conditioners has been studied extensively over the last few years. It has been found that certain zeolites meet two of the above criteria, i.e. they are effective in enhancing the moisture retention of soil and in releasing nutritive ions such as potassium and ammonium to the soil, the ions being incorporated in the zeolite structure.

Such materials have been described in detail in U.S. Pat. No. 4,810,280 to Le Van Mao et al. The patent proposes to use, by admixing with soil, chryso-zeolites produced by acid leaching of chrysotile asbestos and by subsequent impregnation of the resulting solids with an alkali metal hydroxide, notably sodium hydroxide, in an aqueous solution. The production of chryso-zeolites, compounds which retain both the asbestos and zeolite structures, is described in U.S. Pat. No. 4,511,667 to Le Van Mao, et al and in a publication entitled "Leached asbestos materials: precursors of zeolites", Zeolites 1989, vol. 9, 405–411. These references teach the acid leaching step followed by the alkali metal impregnation.

While the method and materials of U.S. Pat. No. 4,810,280 are useful, the zeolites produced and used according to that patent still contain considerable amounts of sodium which is practically almost impossible to substitute to a large extent by other cations e.g. potassium by way of ion exchange. This is probably due to the fact that above certain content limit, sodium in the impregnation step (see above) becomes incorporated both in the zeolite crystalline lattice and in the asbestos matrix. The latter position is much more resistant than the former one, to substitutions by ion exchange without disrupting the zeolite structure.

Phytotoxicity of sodium ions is well known and is a negative factor in the widespread agricultural use of the chryso-zeolites of the U.S. Pat. No. 4,810,280.

Accordingly, there is still a need for materials useful in agriculture for rapid and prolonged storage of water in soils, the materials presenting little or no plant toxicity problems and effective in releasing valuable nutrients to plant roots.

SUMMARY OF THE INVENTION

As mentioned hereinabove, detailed investigation of chemical composition of the chryso-zeolites of type A or X of U.S. Pat. No. 4,810,280 has showed that the sodium form of such zeolites does not lend itself to a practically full ion exchange of sodium by calcium or other cations. It is hypothesized that this fact is due to the presence of a certain amount of sodium in the asbestos remnants which form a matrix of the zeolites. That amount is not easily ion-exchangeable with calcium etc., but nevertheless causes phytotoxicity problems. It has been further hypothesized, therefore, that the amount of sodium in the initial step of making the sodium form of chryso-zeolites should be adjusted so as not to "overload" the zeolite crystalline lattice and thus render most of, or the entire amount of sodium ions, ion-exchangeable with other cations. Such ion exchange should be carried out in relatively mild conditions in order to prevent the disruption of the zeolite structure resulting in the reduction of the water-retention capacity of the material.

It has been found, unexpectedly, that the objects of this invention, i.e., good water retention ability, release of nutrients and low plant toxicity are met by using, in a 2 to 30 wt % admixture with soil, chryso-zeolites of type A and or type X having a silica content of 35 to 60 wt %, MgO of 0.1 to 10 wt %, $Fe_2O_3$ of 0.1 to 2.5 wt %, $Al_2O_3$ of 10 to 45 wt % and containing from 10 to 25% by weight of CaO or CaO and $(NH_4)_2O$, or CaO and $K_2O$, or CaO and ZnO, or CaO and ion-exchangeable MgO, all the oxide contents being determined on the dry oxide basis. The sodium oxide content of the chrysozeolites is lower than 3% by weight as a result of the steps of producing the zeolites. The cations—ammonium, potassium, zinc, magnesium, may be substituted for up to 60% by weight of the calcium form.

According to the invention, the chryso-zeolites are produced by the following steps:

a) preparing a sodium form of chrysolite A or X, the sodium form containing not more than 30% of sodium oxide by weight of the zeolite, b) converting the sodium form into a calcium form of the chryso-zeolite by way of an ion exchange with calcium so as to replace as least 90% of sodium with calcium, and c) optionally replacing up to 60% of the calcium in the calcium form of step b) by one or more of the plant nutrients selected from, but not limited to, a group consisting of potassium, ammonium, zinc and magnesium.

The ion exchange of steps b) and c) is preferably carried out in mild conditions, i.e. in a non-elevated temperature, about 15°-30° C. and with a mild stirring.

As can be seen, the essential difference between the method of U.S. Pat. No. 4,810,280 and that of the present invention is that the former proposes the use of the sodium form, with the sodium form optionally substituted in part by potassium, ammonium or calcium, while the latter proposes steps to replace practically all or almost all sodium with calcium and use only the calcium form optionally substituted in part by the other nutritive cations.

The apparent similarity between the calcium form of U.S. Pat. No. 4,810,280 and that of the instant invention is superficial. According to the invention, the stoichiometry of the reactions leading to the sodium form and then to the calcium form of the chryso-zeolites is controlled so that the resulting calcium form contains less that 3% of residual sodium oxide and the amount of calcium oxide, or the optional substituents thereof (e.g. potassium) does not exceed 25%. This cation content is close to the basic formula of zeolites: $M_{2/n}O \cdot Al_2O_3 \cdot xSiO_2[+yH_2O]$ with x=2 for A-type zeolite (see D. W.

Breck, "Zeolite Molecular Sieves", J. W. Wiley & Sons, New York, 1974, p. 5). The explanation may be found in the mild conditions of the zeolite crystallization operation (80° C.). In the U.S. Pat. No. 4,810,280, the lower limit of $Na_2O$ and/or CaO content is 25%.

BRIEF DESCRIPTION OF THE DRAWINGS

FIG. 3 is a graphic comparison of the water-retention properties of a soil alone, of the soil containing 4.8% of a sodium form (AA-200 Na) of Example 2 and of the soil containing 4.8% of the calcium form having an ammonium content of ca. 4.4 wt % (Example 5).

DETAILED DESCRIPTION OF THE INVENTION

Figure 1:
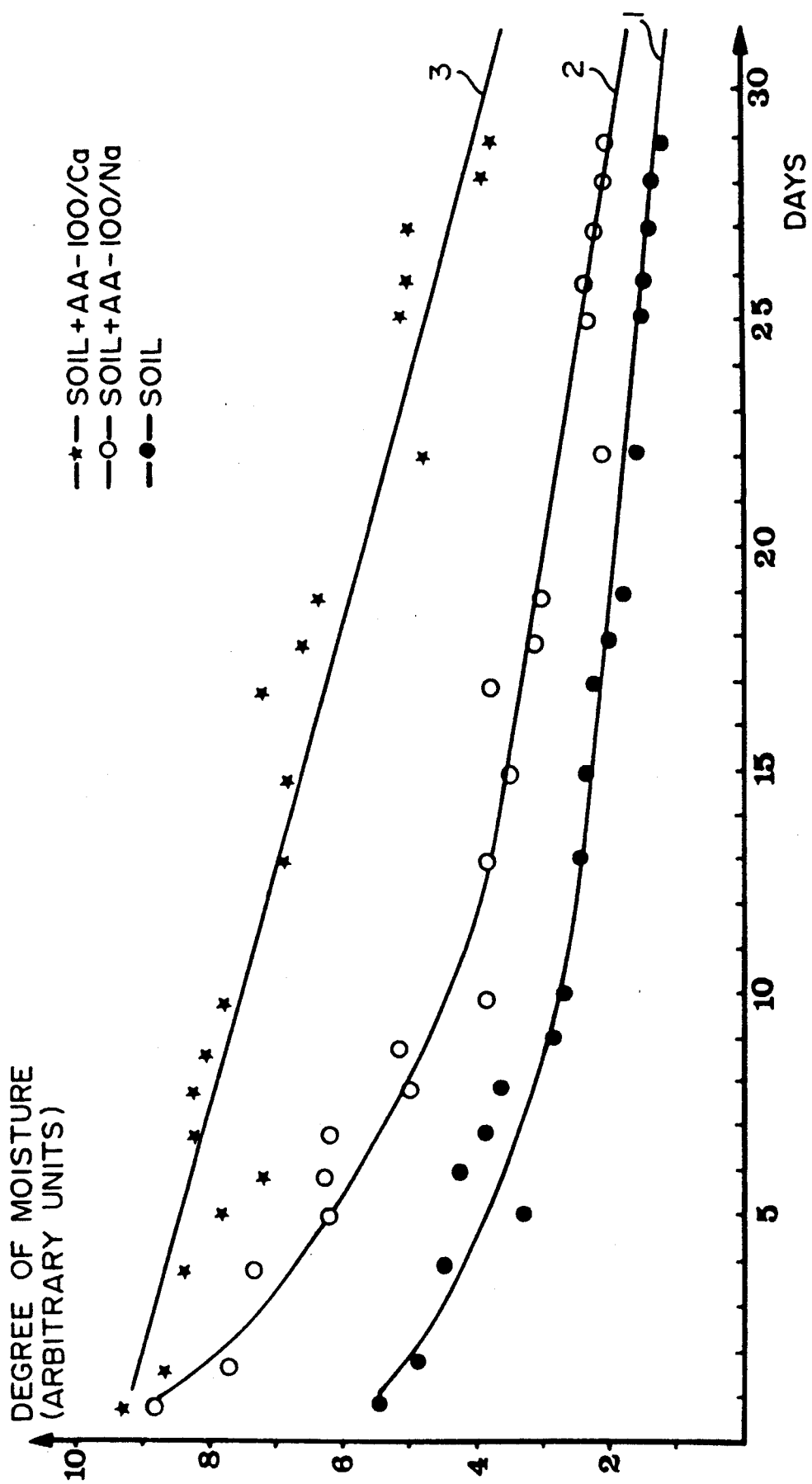
FIG. 1 represents a graphic comparison of the water-retention properties of a soil alone, of the soil containing 4.8% of a sodium form (AA-100/Na) of the invention (Example 1) and of the soil containing 4.8% of the calcium form (AA-100/Ca) of the invention, prepared according to Example 3.

According to the invention, the soil conditioners comprise one or both of the following chryso-zeolite structures:

the A type chryso-zeolite in the calcium form or that form partly exchanged with other plant-nutritive cations, e.g., K or ammonium;

the X type chryso-zeolite in the calcium form or that form partly exchanged with other plant-nutritive cations.

The term chryso-zeolite A as used herein denotes identical materials as those described in U.S. Pat. No. 4,810,280, col. 3 and 4.

The term chryso-zeolite X as used herein denotes identical materials as those described in U.S. Pat. No. 4,810,210, col. 4, 5 and 6.

SOIL CONDITIONING PROPERTIES OF ZEOLITES

The three most important characteristics of the chryso-zeolites which allow the process of the present invention to be carried out are the following:

high retention capacity for water and water-soluble organic and inorganic molecules;

high cation-exchange capacity; and solid, wide and regular framework of channels and cages.

Because of their good cation-exchange capacities, the zeolites can absorb or release nutrients from/into soil by a simple process of equilibrium ion exchange. They can also act as an acidity/alkalinity buffer.

Further, the chryso-zeolites of the invention exhibit a very good water-retention capacity combined with a very low plant toxicity compared to the zeolites with a higher sodium content.

EXAMPLES

The preparation of the products of the present invention and their performance will be illustrated in more detail by referring to the following examples which are given to illustrate but not limit the scope of the invention.

In the examples, mild (or very mild) stirring denotes such a stirring in which the chryso-zeolite particles are not damaged by abrasion (against the stirring bar or the wall of the flask).

EXAMPLE I

Preparation of the chryso-zeolite AA-100/Na 560 g of asbestos fibres [7TF-01 grade fibres from J. M. Asbestos (Quebec, Canada), chemical composition (dried oxide basis: $SiO_2=46.91\%$ wt/wt, $MgO=49.20\%$, $Fe_2O_3=1.92\%$ and $Na_2O=0.78\%$ and other impurities $=1.20$ wt %] were digested in a 4.5N $H_2SO_4$ solution (4,480 ml) at 80 degrees C. for 10 hours. The suspension was allowed to cool down to the ambient temperature, then filtered, washed with water and finally dried at 120° C. overnight. The resulting solid material (271 g) called Alix 100 exhibited the following chemical composition (dried oxide basis): $SiO_2=94.08\%$ wt/wt, $Al_2O_3=1.40\%$, $MgO=1.75\%$, $Fe_2O_3=1.97\%$ and $Na_2O=0.80\%$. Its MLD was 96.4%.

Whenever used herein, the term MLD is defined as:

$$MLD\ (\%) = \frac{(MgO)_i - (MgO)_f}{MgO_i} \times 100,$$

where $(MgO)_i$ and $(MgO)_f$ are respectively, the initial and final magnesium contents (on the dried oxide basis).

The Alix 100 material was characterized by the BET technique [using a Micromeretics, Model ASAP instrument) which gave a BET surface as determined by absorption of nitrogen of 443 m$^2$/g, and a pore size distribution as determined by the technique of BJH (E. P. Barrett, L. G. Joyner and P. P. Halenda): large pores (pore size between 17 angstroms to 3,000 angstroms)=80% and micropores (pore size less than 17 angstroms)=20% for a total pore volume of 0.378 cc/g.

260 g of the leached asbestos material (Alix 100) were mixed with an aqueous solution containing NaOH (67.60 g), sodium aluminate (520 g) from Fisher Sc. Co. [% weight composition=$Al_2O_3=46.8$, $Na_2O=28.4$, water=balance] dissolved in 2,470 ml of distilled water. The suspension was loaded in polypropylene flasks which were heated in an oil bath at 80° C. for 3 days.

After unloading, the suspension was filtered and the solid was washed thoroughly with distilled water and dried at 120° C. for approximately 12 hours.

The resulting solid (527 g) exhibited the A zeolite structure through the X-ray powder diffraction technique. Its degree of crystallinity was 102% when compared with the commercial Linde Na-A zeolite powder form. Its chemical composition (dried oxide basis) was as follows:

$SiO_2=36.79\%$ wt/wt, $Al_2O_3=42.14\%$, $MgO=0.60\%$, $Fe_2O_3=0.44\%$, $Na_2O=20.03\%$. Its MLD was 98.8%. The resulting chryso-zeolite was labelled AA-100/Na.

EXAMPLE 2

Preparation of the chryso-zeolite AA-200/Na 560 g of asbestos fibres [4 grade fibres from Cassiar Mining Corp., (British Columbia, Canada), chemical composition (dried oxide basis): $SiO_2=42.35\%$ wt/wt, $MgO=53.17\%$, $Fe_2O_3=3.31\%$ and $Na_2O=0.09\%$ and other impurities$=1.08\%$] were digested in a 4.5N $H_2SO_4$ solution (4,480 ml) at 80° C. for 10 hours. The suspension was allowed to cool down to ambient temperature, then filtered, washed with water and finally dried at 120° C. overnight. The resulting solid materials (275 g) called Alix 200 exhibited the following chemical composition (dried oxide basis): $SiO_2 = 97.46\%$ wt/wt, $Al_2O_3 = 0.18\%$, $MgO = 1.75\%$, $Fe_2O_3 = 0.51\%$ and $Na_2O = 0.10\%$. Its MLD was 96.7%. Its BET surface area was 461 m²/g and its pore size distribution was as follows: Large pores = 88% and micropores = 12% for a total pore volume of 0.391 cc/g.

260 g of the leached asbestos material (Alix 200) were mixed with an aqueous solution containing NaOH (67.60 g), sodium aluminate (520 g) from Fisher Sc. Co. dissolved in 2,470 ml of distilled water. The suspension was loaded in polypropylene flasks which were heated in an oil bath at 80° C. for 3 days.

After unloading, the suspension was filtered and the solid was washed thoroughly with distilled water and dried at 120° C. for approximately 12 hours.

The resulting solid (525 g) exhibited the A zeolite structure through the X-ray powder diffraction technique. Its degree of crystallinity was 105% when compared with the commercial Linde Na-A zeolite. Its chemical composition (dried oxide basis) was as follows: $SiO_2 = 28.69\%$ wt/wt, $Al_2O_3 = 40.71\%$, $MgO = 0.69\%$, $Fe_2O_3 = 0.35\%$ and $Na_2O = 29.56\%$. Its MLD was 98.7%. The resulting chryso-zeolite was labelled AA-200/Na.

In the above examples, it was essential not to exceed the temperature of 80° C. during the crystallization with the NaOH solution, and maintain the crystallization for at least 2 days.

EXAMPLE 3

Preparation of the chryso-zeolite AA-100/Ca 20 g of the chryso-zeolite AA-100/Na of Example 1 were brought in contact with an aqueous solution of $CaCl_2$ at 10 wt %, using 10 ml of solution per gram of compound. The suspension was very mildly stirred at room temperature for 3 hours. The suspension was allowed to settle and the liquid was then rapidly removed. A fresh volume of $CaCl_2$ solution was added and the suspension was again very mildly stirred at room temperature for another 3 hours. The same procedure was repeated at another time so that the entire operation lasted 9 hours.

The suspension was filtered and the solid was washed until $Cl^-$ ions were no longer present in the washings. The compound was dried at 120° C. for 12 hours (17 g) and fully characterized. Its Na and Ca contents (as $Na_2O$ and CaO) were 1.8 wt % and 18.5 wt %, respectively. This sample which was labelled chryso-zeolite AA-100/Ca, had a degree of crystallinity of 66% (determined through the X-ray powder diffraction technique) when compared with the commercial Linde Ca-A zeolite. Its BET surface area was 490 m²/g and a pore size distribution as follows: Large pores = 88% and micropores = 12% for a total pore volume of 0.244 cc/g.

EXAMPLE 4

Preparation of the chryso-zeolite AA-200/Ca 40 g of the chryso-zeolite AA-200/Na of Example 2 were brought in contact with an aqueous solution of $CaCl_2$ at 10 wt %, using 10 ml of solution per gram of compound. The suspension was very mildly stirred at room temperature for 3 hours. The suspension was allowed to settle and the liquid was then rapidly removed. A fresh volume of $CaCl_2$ solution was added and the suspension was again very mildly stirred at room temperature for another 3 hours. The same procedure was repeated another time so that the entire operation lasted 9 hours.

The suspension was filtered and the solid was washed until $Cl^-$ ions were no longer present in the washings. The compound was dried at 120° C. for 12 hours (35 g) and fully characterized. Its Na and Ca contents (as $Na_2O$ and CaO) were 2.4 wt % and 21.8 wt %, respectively. This sample which was labelled chryso-zeolite AA-200/Ca, had a degree of crystallinity of 67% (determined through the X-ray powder diffraction technique) when compared with the commercial Linde Ca-A. Its BET surface area was 550 m²/g and a pore size distribution as follows: Large pores = 12% and micropores = 88% for a total pore volume of 0.272 cc/g.

EXAMPLE 5

Preparation of the chryso-zeolite AA-200/Ca/AM (2)

20 g of the chryso-zeolite AA-200/Ca of Example 4 were brought in contact with an aqueous solution of $NH_4Cl$ at 10 wt %, using 10 ml of solution per gram of compound. The suspension was very mildly stirred at room temperature for 3 hours. The suspension was allowed to settle and the liquid was rapidly removed. A fresh volume of $NH_4Cl$ solution was added and the suspension was again very mildly stirred at room temperature for another 3 hours.

The suspension was filtered and the solid was washed until $Cl^-$ ions were no longer present in the washings. The compound was dried at 120° C. for 12 hours (21 g) and fully characterized. Its ammonium content was 4.4 wt %. This sample which was labelled chryso-zeolite AA-200/Ca/Ca/AM (2), had a degree of crystallinity of 63% (determined through the X-ray powder diffraction technique) when compared with the commercial Linde Ca-A zeolite.

EXAMPLE 6

Preparation of the chryso-zeolite AA-100/[Ca+AM (2)]

20 g of the chryso-zeolite AA-100/Na of Example 1 were brought in contact with an aqueous solution of $CaCl_2$ (10 wt %) and $NH_4Cl$ (10 wt %), using 10 ml of solution per gram of compound. The suspension was very mildly stirred at room temperature for 3 hours. This suspension was allowed to settle and the liquid was then rapidly removed. A fresh volume of $CaCl_2 + NH_4Cl$ solution was added and the suspension was again very mildly stirred at room temperature for another 3 hours. The suspension was filtered and the solid was washed until $Cl^-$ ions were no longer present in the washings. The compound was dried at 120° C. for 12 hours (21 g) and fully characterized. Its ammonium content was 1.8 wt %.

This sample which was labelled chryso-zeolite AA-100/[Ca+AM (2)], had a degree of crystallinity of 65% (determined through the X-ray powder diffraction technique) when compared with the commercial Linde Ca-A zeolite.

EXAMPLE 7

Preparation of the chryso-zeolite AA-100/Na+AM (2)

20 g of the chryso-zeolite AA-100/Na of Example 1 were brought in contact with an aqueous solution of $NH_4Cl$ (10 wt %), using 10 ml of solution per gram of compound. The suspension was very mildly stirred at room temperature for 3 hours. This solution was allowed to settle and the liquid was then rapidly removed. A fresh volume of NH₄Cl solution was added and the suspension was again very mildly stirred at room temperature for another 3 hours.

The suspension was filtered and the solid was washed until Cl⁻ ions were no longer present in the washings. The compound was dried at 120° C. for 12 hours (18 g) and fully characterized. Its Na and ammonium contents were 6.3 wt % and 13.7 wt %, respectively. Its degree of crystallinity was 98% when compared with the commercial Linde Na-A zeolite. The resulting chryso-zeolite was labelled AA-100/Na+AM (2).

Measurement of the Water-Retention Properties of Mixtures Containing Soil and the Various Chryso-Zeolites of the Present Invention In order to assess the water-retention properties of soil containing the various zeolites prepared in accordance with the present invention and to compare these properties with the water-retention capacities demonstrated by soil, the following procedure was chosen: soil was intimately admixed with the active material (chryso-zeolite), after which the degree of moisture of the resulting mixture and of a reference soil was measured. The same volume of water was then homogeneously spread on the mixture and on the reference soil, after which moisture measurements were taken periodically.

In the tests of the present report, a potting soil (Folia Mix, from Lemoine Tropical Montreal, Canada. Loss of ignition up to 550° C.=up to 40% wt/wt) was used. A mixture of 200 g of soil and 10 g of chryso-zeolite (dehydrated, concentration—ca 4.8 wt %) was poured into a flower pot having an upper diameter of 100 mm and a lower diameter of 60 mm. 200 g of pure soil were loaded in a similar container in order to serve as a reference sample.

All the pots were placed in a wooden box where the temperature could be measured (temperature range: 22° C.-24° C.). In a subsequent step, 25 ml of distilled water were spread dropwise and evenly onto the sample surface. The day following the wetting operation, the moisture contents of the soil and the mixtures were measured using a Mask-Rite Moisture Meter (full scale: 10 arbitrary units). Readings were taken at different locations within the samples by having the tip of the Mask-Rite hydrometer inserted at about 30 mm from the soil or mixture surface. Average values are reported in the attached figures. The measurements of the degree of moisture were taken periodically, usually with a 24-hour frequency. The moisture degree was finally plotted against the time. It's worth mentioning that the degree of moisture measured in the present report was that of the soil, i.e. the water retained was assumed to be available to the plant roots.

Figure 2:
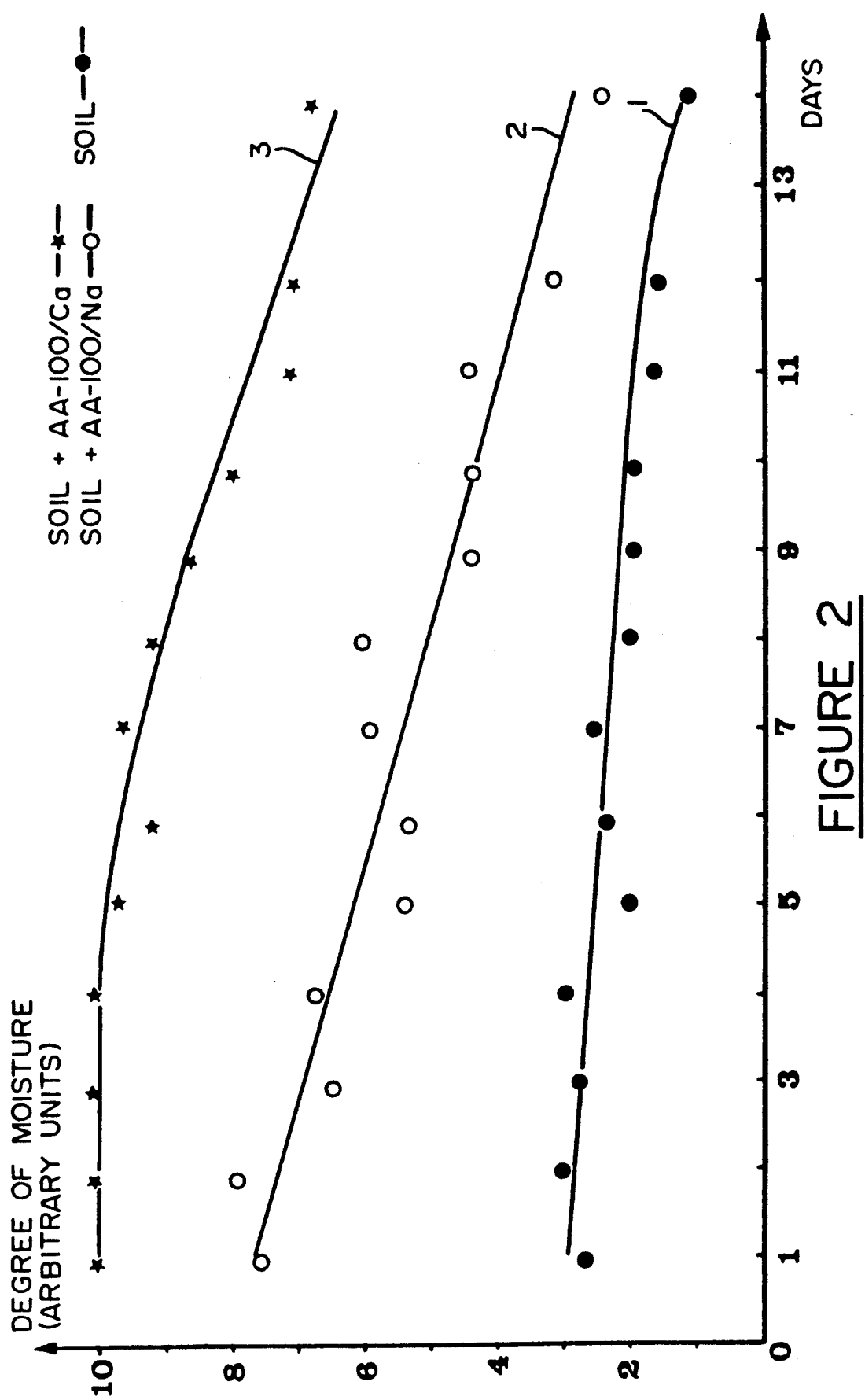
FIG. 2 represents a graphic comparison of the water-retention properties of a soil alone, and of the same sodium form and calcium form as FIG. 1 but with additional wetting of the soils.

FIG. 1 shows the moisture degree curves of the pots containing: Curve 1=the soil only; Curve 2=the "soil+chryso-zeolite AA-100/Na (of example 1)" mixture and Curve 3=the "soil+chryso-zeolite AA-100/Ca (of Example 3" mixture). The soil used in this first series of tests (Cycle A) was not dried prior to the testing. FIG. 2 shows Cycle B of tests which were carried out by wetting the same soil (curve 1), the mixture "soil+chryso-zeolite AA-100/Na (of Example 1)" (curve 2) and the mixture "soil+chryso-zeolite AA-100/Ca (of Example 3)" (curve 3) with another 25 ml of water before measuring periodically the degree of moisture of the pot content.

FIG. 3 shows the moisture degree curves of the pots containing respectively: curve 1=soil only; curve 2="soil+chryso-zeolite AA-200/Na (of Example 2)" mixture; and curve 3="soil+chryso-zeolite AA-200/Ca/AM (2) (of Example 5)" mixture.

Another series of tests was performed under the same conditions as previously described. The soil and two solid mixtures prepared by admixing the soil with the AA-100/Ca+AM (2) chryso-zeolite (Example 6) or the AA-100/Na+AM (2) chryso-zeolite (Example 7). With these two soil-ammonium being chryso-zeolite mixtures, there was *not any significant enhancement* in terms of water-retention properties when compared with those of the soil alone. (see Table 1).

CONCLUSIONS

The previous work on the water-retention enhancing zeolites (U.S. Pat. No. 4,810,280) has showed interesting water-retention and ion-exchange properties of the sodium form of chryso-zeolites of type A and X. Calcium was suggested to be one of the substituents for agricultural use and no advantage of the calcium-substituted form over the sodium form was indicated.

Surprisingly the calcium form, where calcium replaces at least 90% of sodium, has now shown a visibly higher water retention than the sodium form, as evidenced by the drawings. This may be explained by the "hydrophilic" character of the Ca ions and a favorable change of the chrysozeolite adsorption surface upon ion-exchange.

It has also been shown herein that the calcium form, with extremely low Na content, is suitable for agricultural use due to a negligible plant toxicity. Moreover, the Ca form guarantees a high level of water-retention capacity when ammonium or other plant nutrients are incorporated into the chryso-zeolite by ion exchange of some Ca ions with ammonium ions (see FIG. 3). Any attempts to incorporate ammonium (or other nutrients, e.g. potassium, zinc, magnesium, etc.) by ion-exchange directly with sodium form of the chryso-zeolite by means of an ammonium salt solution or an aqueous solution containing a mixture of an ammonium salt and a Ca salt lead to an ammonium containing chryso-zeolite with relatively low water-retention capacities (see Table 1).

One of the key factors of zeolites is their chemical composition. Aluminum atoms belonging to the zeolite lattice are elements which determine the hydrophilicity and the cation-exchange capacity of the zeolite. The higher the framework aluminum atoms content of the zeolite, the higher the propensity of the zeolite surface to retain water. The higher the framework aluminum content of the zeolite, the higher the cation-exchange capacity of the zeolite. The latter property is due to the presence of cations whose role is to balance the negative charges created by the presence of such lattice aluminum atoms.

In this context, zeolites of the A-type which exhibit the highest framework Al atoms content are the most performing among the zeolite family. However, this does not exclude the use of other zeolites such as X, Y, clinoptilolite, chabazite, F, ..., zeolites. Although these zeolites have lower Al contents—thus lower water-retention and cation-exchange capacities—they can be used for specific applications (for instance, release of ammonium ions with clinoptilolite-type zeolite or of magnesium ions with X-type zeolite).

The Ca-form of the A-type chryso-zeolite is the best performing in terms of water-retention capacity and ease of cation-exchange with cations other than Na (in the phase of loading of these cationic plant nutrients into the chryso-zeolite). This is the reason why the examples of this patent are focused on the A-type chryso-zeolite. However, the examples are not intended to limit the scope of the invention which is defined only by the appended claims.

TABLE 1

Water-retention capacity of chrysozeolite of Example 5 versus that of chrysozeolites of Examples 6 and 7.

| MIXTURE | Day No. | MOISTURE DEGREE (arbitrary units) | MIXTURE | Day No. | MOISTURE DEGREE (arbitrary units) |
|---|---|---|---|---|---|
| Soil | 1 | 5.5 | Soil + | 1 | 5.8 |
|  | 2 | 4.7 | AA-100/Ca + AM(2) | 2 | 5.1 |
|  | 5 | 3.2 | (Example 6) | 5 | 3.4 |
|  | 8 | 3.4 |  | 8 | 4.0 |
|  | 10 | 2.6 |  | 10 | 2.8 |
|  | 15 | 2.4 |  | 15 | 2.7 |
|  | 18 | 2.0 |  | 18 | 1.6 |
| Soil + | 1 | 8.0 | Soil + | 1 | 7.4 |
| AA-200/Ca/AM(2) | 2 | 8.8 | AA-100/Na + AM(2) | 2 | 6.2 |
| (Example 5) | 5 | 10.0 | (Example 7) | 5 | 4.5 |
|  | 8 | 9.8 |  | 8 | 4.2 |
|  | 10 | 9.9 |  | 10 | 3.8 |
|  | 15 | 8.5 |  | 15 | 3.0 |
|  | 18 | 8.0 |  | 18 | 2.4 |

I claim:

1. A method of enhancing the water-retention capacity of a soil and providing plant nutrients to the soil over an extended period of time, said method comprising, admixing the soil with from 2 to 30% by weight of a chryso-zeolite of type A and/or type X having a silica content of 35 to 60% by weight, a MgO content of 0.1 to 10% by weight, a $Fe_2O_3$ content of 0.1 to 2.5% by weight, an $Al_2O_3$ content from 10 to 45% by weight and containing from 10 to 25% by weight of CaO or CaO and $(NH_4)_2O$, all the oxide contents being determined on the dried oxide basis, said chryso-zeolite having a BET surface area higher than 400 m²/g and a pore size distribution which comprises from 10% to 20% based on the surface area, of pores whose diameter is larger than 17 angstroms.

2. The method according to claim 1 wherein the chryso-zeolite has a $Na_2O$ content lower than 3% by weight.

3. A method according to claim 1 wherein up to 60% by weight of CaO is replaced by $(NH_4)_2O$.

4. The method according to claim 1 wherein the chryso-zeolite is obtained by the following steps:

a) preparing a sodium form of a chryso-zeolite type A or X with a $Na_2O$ content below 30% by weight, and b) substituting at least 90% of the sodium oxide by calcium oxide under conditions effective to prevent deterioration of the texture properties of the zeolite, and c) optionally substituting up to 60% of the calcium oxide content of the zeolite obtained in step (b) by other nutritive components comprising ammonium or potassium oxide.

5. The method according to claim 4 wherein the step a) is carried out by:

i) leaching the asbestos material in an acidic medium, ii) impregnating the magnesium leached substance with an aqueous soution of sodium aluminate and sodium hydroxide, iii) heating the substance of ii) at up to 80° C. for at least about 2 days, preferably for 3 days, iv) drying the substance of step iii).

* * * * *